April 7, 1942.                    F. H. SHAW                    2,279,208
                          RELIEF MOLDING OF PLASTICS
                     Filed Aug. 10, 1938          2 Sheets-Sheet 1
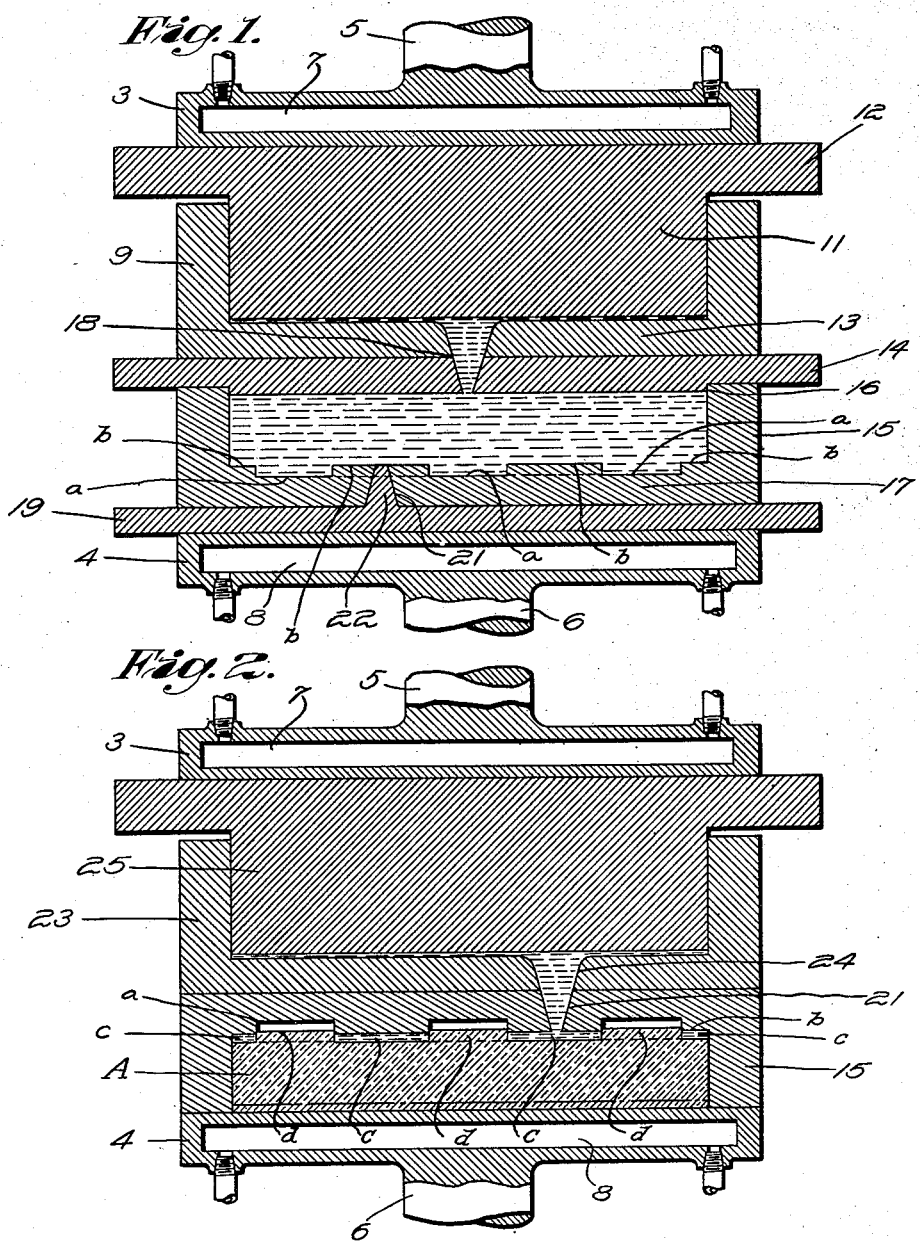
Witness
N. B. Thayer
Inventor
Frank H. Shaw
by Brown & Parham
Attorneys April 7, 1942.   F. H. SHAW   2,279,208
RELIEF MOLDING OF PLASTICS
Filed Aug. 10, 1938   2 Sheets-Sheet 2

Witness
W. B. Thayer

Inventor
Frank H. Shaw
By Brown & Parham
Attorneys

Patented Apr. 7, 1942

2,279,208

UNITED STATES PATENT OFFICE 2,279,208

RELIEF MOLDING OF PLASTICS

Frank H. Shaw, South Orange, N. J., assignor to Shaw Insulator Company, Irvington, N. J., a corporation of New Jersey Application August 10, 1938, Serial No. 224,010

9 Claims. (Cl. 18—30)

This invention relates to the molding of articles from plastics such as phenolic condensation compounds and has particular relation to the molding of decorations or designs on such articles.

The general object of the invention is to provide a novel method and novel means for molding articles having decorations or designs thereon which may differ in color appearance from the backgrounds of the decorations or designs.

More particularly, it is an object of the invention to produce articles from plastics upon which articles designs or backgrounds for designs may be molded in relief. This may be accomplished by first molding an article in a die which is so shaped as to form a design or background in relief on the article, and then molding additional plastic around or adjacent the relief molded portion or portions of the article. The additional plastic molded on the article may be confined in sunken areas adjacent the relief molded portions, or if desired, may be molded in raised designs or figures. The additional plastic may differ in color, composition or texture from that used in forming the body of the article. This method of molding plastics may be referred to as "relief molding."

Other and more specific objects of the invention will be pointed out in the description which follows and which has reference to the accompanying drawings which illustrate two embodiments of the invention.

In said drawings:

Figure 1 is a view in vertical section of portions of molding apparatus for initially forming an article from a plastic;

Fig. 2 is a similar view showing the molding of additional plastic in sunken areas in the article formed in Fig. 1;

Figure 3:
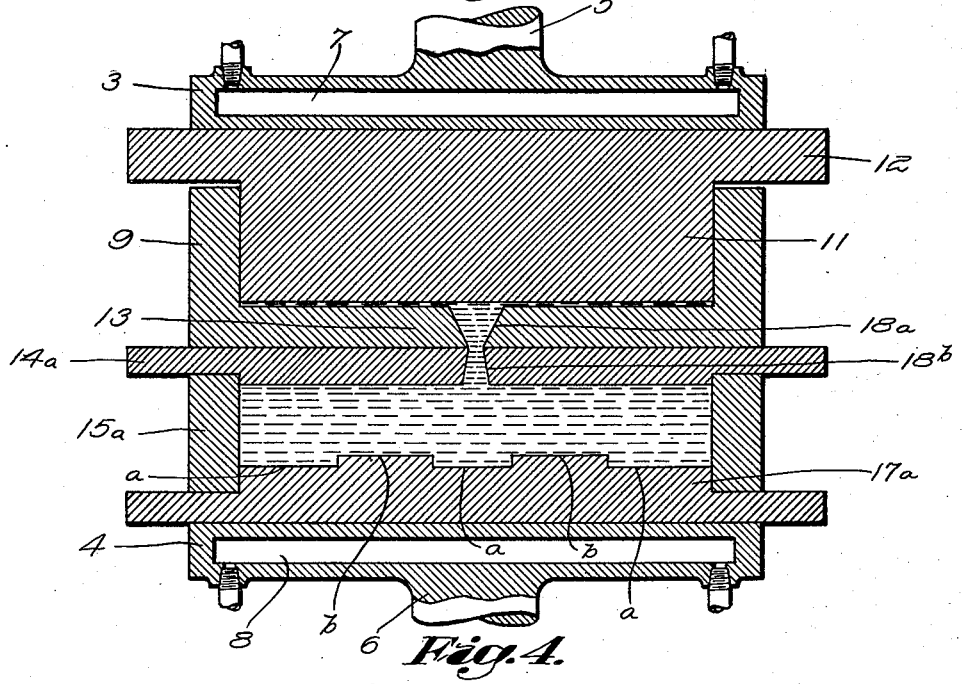
Fig. 3 is a view similar to Fig. 1, showing a modification thereof.

The first step of the method of the present invention shown in Figs. 1 and 2 is to mold partially the desired article from a plastic such as a thermosetting compound of selected color, composition or texture. Such compound may be a phenolic condensation product, urea-formaldehyde composition, or any other suitable organic compound or plastic.

The plastic for the article preferably is used in the form of a molding powder which is introduced into, and formed in, a die in which a design is cut. The article may be molded initially either by compression or by "transfer molding," that is, by plasticating the composition in a cylinder, forcing it into the die cavity through a narrow passage, and maintaining hydrostatic pressure in the mold cavity during curing of the molded piece.

The drawings show how the article may be formed initially or partially by "transfer molding" in molding means of the type adapted to be inserted between the heated platens of a press. At 3 and 4 I have shown the upper and lower press platens of a conventional type of hydraulic press, the platens being operated by rams shown partially at 5 and 6, and the platens having heating chambers 7 and 8 through which steam is passed to heat the platens to the desired temperature.

A cylinder or pot is shown at 9, Fig. 1, into which the molding powder is introduced and from which it is discharged after being rendered plastic by piston 11, having a rim or shoulder 12.

Cylinder 9 rests upon cover plate 14 of the die or mold 15 and is centered therein by a boss 16. The die 15 is shaped to form a disc shaped article and has the design or decoration to be formed in relief on the article to be molded cut in the bottom 17 thereof. Portions of the design are shown at *a, a, a*, the raised portions *b, b, b* serving to form a sunken background for the design. The raised portions *b, b, b* do not separate the sunken portions or depressions from each other, but such depressions are in communication below the tops of the raised portions.

A downwardly tapered sprue 18 is formed in the bottom 13 of cylinder 9 and in cover plate 14 for the delivery of plastic into the die cavity. Cover plate 14 also serves as a sprue plate.

The die 15 rests on plate 19 and has a sprue 21 formed therein which is closed, however, by a plug 22 on the plate when the parts are assembled as shown in Fig. 1. Sprue 21 extends through one of the raised portions *b*.

In molding an article, cylinder 9, plate 14, die 15 and plate 19 are assembled and secured together by suitable means, not fully shown. The molding powder, such as phenolic condensation compound is poured into cylinder 9 in a quantity in excess of that necessary to fill the die and passage 18 so as to leave an excess in cylinder 9 when the die cavity is filled. The mold assembly is now placed between the platens 3 and 4 and pressure applied thereto while the various parts of the mold assembly are heated by the platens. The molding powder in cylinder 9 is thus heated and becomes plastic and is forced out of the cylinder 9 by piston 11 through the sprue at 18 into the die 15 until the descent of the piston 11 is stopped by the excess of material in the bottom of the cylinder. This excess of material permits hydrostatic pressure to be maintained by piston 11 on the mold charge for the desired period of time.

Ordinarily, in molding thermosetting compounds by transfer molding, the application of heat and hydrostatic pressure to the molded piece is continued until the piece is completely cured. However, in the present method, the curing is only partially effected at this time, the pressure being relieved on platens 3 and 4 and the mold assembly removed. The die 15 containing the partly cured article is now separated from plate 14, this serving to break the article from the sprue material in sprue 18 which remains connected to the excess material in cylinder 9. Plate 19 is now removed to open passage 21.

In order to mold additional plastic in the sunken areas on the face of the article, the die is now inverted and a second pot or cylinder 23 secured thereto by suitable means not shown. The cylinder 23 has a passage 24 in its bottom which registers with passage 21 in die 15 to form a downwardly tapered sprue. This arrangement permits the additional plastic to be molded on the article and the article to be completed by transfer molding in the following manner.

Molding powder of different color or composition from that of the partly cured article and which also may be a thermosetting compound, is poured into cylinder 23 and a piston 25 placed therein. The amount of molding powder used is sufficient to leave an excess in the bottom of cylinder 23 when the molding operation is completed. The mold assembly is now placed between the platens 3 and 4 of the press and heat and pressure applied thereto as before.

At the beginning of this operation, a space will exist at the bottom of die 15 left therein by boss 16 in plate 14. This space is located below the dot and dash line in Fig. 2. When the compound in pot 23 becomes sufficiently plastic, it will flow through sprue 24—21 and the hydrostatic pressure exerted by piston 25 will force the article A downwardly in the die 15 into contact with platen 4.

When the article A is forced downwardly in die 15, the raised portions b of the die will be partly withdrawn from the depressions c in the article and raised portions d on the article will be partly withdrawn from the cavities a in the die. As this happens, the plastic compound from pot 23 will be forced into and will partly fill the sunken areas or depressions indicated at c, c, c forming the background for the relief molded design at d, d, d. The plastic first enters the depression c beneath the sprue 24—21, then flows into the other depressed areas which communicate therewith.

When the plastic is molded at c, c, c, the partly cured article will be sufficiently plastic to be welded thereto. The article A is subjected to further heating between platens 3 and 4, while hydrostatic pressure is maintained on the article by piston 25, to bring the curing of the article to completion and to rigidify or harden all parts of the article. The material at c, c, c will cure relatively quickly because of its thin section.

The mold unit of Fig. 2 is now removed from between the platens and the cylinder 23 separated from the die 15. This breaks the sprue material in sprue 24—21 from the article A which may now be removed from the die.

Preferably the boss 16 of the plate 14 is made of less length than the depth of the sunken portions a, a, a to prevent the relief molded portions d, d, d being completely withdrawn from said sunken portions in the operation illustrated in Fig. 2. This preserves the relief character of the design and avoids the molding of plastic over the top of the relief molded portions.

It will be apparent that the design or decoration may be formed by the sunken areas on the article instead of the raised areas. In other words, the design may be formed by the plastic at c, c, c, introduced from pot 23 instead of by the relief molded portions d, d, d initially molded on the article A.

In molding designs which require that the sunken areas be disconnected instead of communicating as described above, a plurality of sprues may be provided in the bottom of die 15 for the separate supply of plastic from cylinder 23 into each separate sunken area or depression. In such event, a corresponding number of plugs like plug 22 will be provided on plate 19.

After an article has been partly molded, as shown in Fig. 1, the partially set excess and sprue material will be removed from the cylinder 9, the parts being designed to facilitate such removal. The completely set excess and sprue material are likewise removed from cylinder 23. Upon such removal of material another article may be molded as above described.

Figure 4:
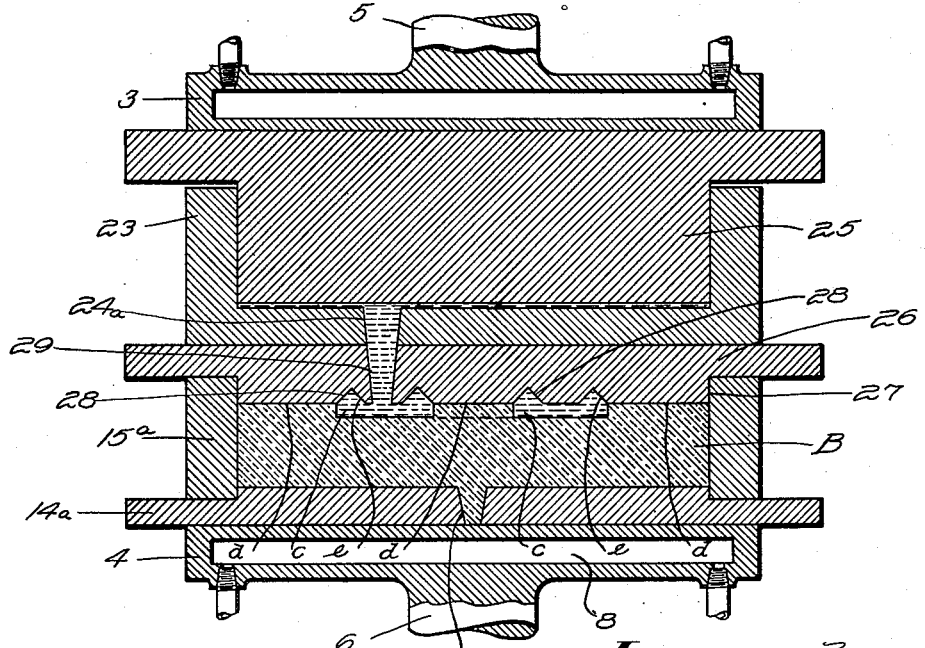
Fig. 4 is a view similar to Fig. 2, showing the molding of additional plastic in relief on the article formed in Fig. 3.

Instead of confining the additional plastic to the sunken areas initially molded in the article, such additional plastic may be molded in relief on the article as shown in Figs. 3 and 4. In these figures the press platens 3 and 4, the pot 9 and piston 11, and the pot 23 and piston 25, are substantially the same as the parts correspondingly numbered in Figs. 1 and 2.

The die portion 15a of Figs. 3 and 4 has fitted therein a separate bottom 17a provided in its inner side with sunken portions a, a, a and raised portions b, b. The downwardly converging sprue 18a in the bottom 13 of cylinder 9 registers with the downwardly diverging sprue 18b in mold top 14a, so that the sprue material will part between the cylinder and mold top when those parts are separated.

With the parts assembled as shown in Fig. 3, plastic is delivered to the die cavity to partly form an article as described above with reference to Fig. 1. The cylinder 9 is now disengaged from the mold top 14a and the mold is inverted into the position shown in Fig. 4. This places mold top 14a in contact with platen 4 which closes the sprue 18b.

The die or mold will contain the partly formed article B, the upwardly facing side of which has sunken areas c, c and raised portions d, d, d formed thereupon.

A mold top 26 is now engaged with die portion 15a. This mold top has a boss 27 of sufficient length to engage the top of article B and contains annular recesses 28, 28 which register with the sunken areas c, c. The mold top also has a sprue 29 with which sprue 24a in the bottom of cylinder 23 is aligned when the cylinder is positioned, as shown in Fig. 4. Additional plastic may now be forced from cylinder 23 by piston 25 and into the sunken areas c, c in the article B and into the recesses 28, 28 in the mold top 26.

Thus, not only are the sunken areas c, c filled with additional plastic, but raised or relief molded portions e, e of desired configuration are formed on the article B. The additional plastic and that of the body of article B are now completely cured after which the article is removed from the die.

By employing mold tops and bottoms of various shapes and sizes, a wide variety of designs may be molded on the articles and several colors or kinds of plastics may be molded on the same piece. Thus the molding operation shown in Fig. 4 may be repeated, the curing periods being reduced in the initial molding operation of Fig. 3, and the second molding operation of Fig. 4, and the curing of all portions of the article being completed in a third molding operation.

It will be seen from the foregoing that I have provided a novel method and novel means for making articles from plastics having decorations or designs thereon, which are different in color or composition or texture from the background of the design and on which either the design or the background may be molded in relief.

Various changes may be made in the details of construction and performance of the method without departing from the scope of the claims. The types of compositions referred to herein are mentioned as examples only of plastics which may be employed in practicing the invention, and the invention is not limited to the use of the specific types of plastics referred to.

Having described my invention, what I claim is:

1. The method of molding decorated articles of organic plastics which comprises partially molding an article from an organic plastic of selected color by subjecting said plastic to heat and pressure in a die, which die has a depression forming design cut therein, and molding an organic plastic of a different color solely over a depression formed on the face of the article by said die, by enlarging said die cavity to permit displacement of the partially molded article, subjecting said last named plastic to heat and pressure to soften it and to cause it to flow into the die in which said article is confined, to displace the partially formed article and then to flow into the depression in the face of said article, and protecting areas other than said depression from the last-named plastic.

2. The method of molding decorated articles from organic plastics which comprises partially molding an article from an organic plastic of selected color by subjecting said plastic to heat and pressure in a die, said die having a design cut therein for molding a design in relief on said article, and molding organic plastic of a different color on said article around said design to form a background for said design, by subjecting said last named plastic to heat and pressure to soften it and to cause it to flow into the die in which said article is confined and flow around said relief design while said article also is subjected to heat and to the pressure applied to said last named plastic and while the area of said design is protected from the last named plastic.

3. The method of molding decorated articles from organic thermosetting plastics which comprises partially molding an article from a certain kind of thermosetting plastic in a die having a design cut therein, partially reacting the plastic of said article in said die, molding thermosetting plastic of a different kind in a depression formed in a face of said article by said die, by subjecting said different kind of thermosetting plastic to heat and pressure to soften it and to deliver it into the die cavity in which said article is confined while protecting the design from the last-named plastic and completely reacting the different thermosetting plastics composing said article while applying pressure thereto through the last-named plastic 4. The method of molding articles from organic plastics which comprises partially molding an article by introducing organic plastic under heat and pressure into a closed die through a passage in one side thereof, and completing the molding of the article by the introduction of organic plastic under heat and hydrostatic pressure through a passage in another side of said closed die against which the article was partially molded.

5. A mold construction for molding articles from organic plastics comprising a die having a cavity therein, and a member engaging said die to close said cavity, said member and said die having passages formed therein for the introduction of plastic under heat and hydrostatic pressure to opposite sides of said die cavity, and means entering and filling one of said passages while organic plastic is being supplied to said cavity through the other of said passages.

6. A mold construction for molding articles from organic plastics comprising a die having a cavity therein, said die having a design cut therein for forming raised and sunken areas on the face of an article molded therein, means for partially molding an article from a plastic in said die, and means for molding additional organic plastic over a sunken area only on said article and for completing the molding of said article in said die, including means for delivering said additional organic plastic under heat and pressure into said sunken area while said article is enclosed by mold construction including a major part of said die.

7. A mold construction for molding articles from plastics comprising a die having a cavity therein, said die having a design cut therein for forming raised and sunken areas on the face of an article molded therein, means for partially molding an article from a plastic in said die, means for molding additional plastic in a sunken area on said article and for completing the molding of said article in said die, including a passage formed in the bottom of said die, and means for introducing said additional plastic under hydrostatic pressure through said passage into said die and into the sunken area in the article.

8. The method of molding articles from organic plastics which comprises partially molding an article in a die from a selected organic plastic by heat and pressure, replacing a part of said die with a part having a design cut therein and closing said die, and thereafter molding said design in relief on a selected area only of said article in the closed die from selected additional organic plastic by delivering to and filling the design cut in said die part with said additional plastic by subjecting it to heat and pressure, while protecting the remaining areas of the article from said additional plastic.

9. The method of molding decorated articles from organic plastics which comprises initially molding an article in a die under heat and pressure, engaging the die with a top having a design cut therein and closing the die, and introducing plastic under heat and hydrostatic pressure to said closed die to form said design in relief on a selected area only of said article while protecting the remaining areas of said article from said last named plastic.

FRANK H. SHAW.